Oct. 9, 1934.    R. B. OTWELL    1,976,086
HEATER FOR MOTOR VEHICLES
Filed Feb. 10, 1931    3 Sheets-Sheet 1
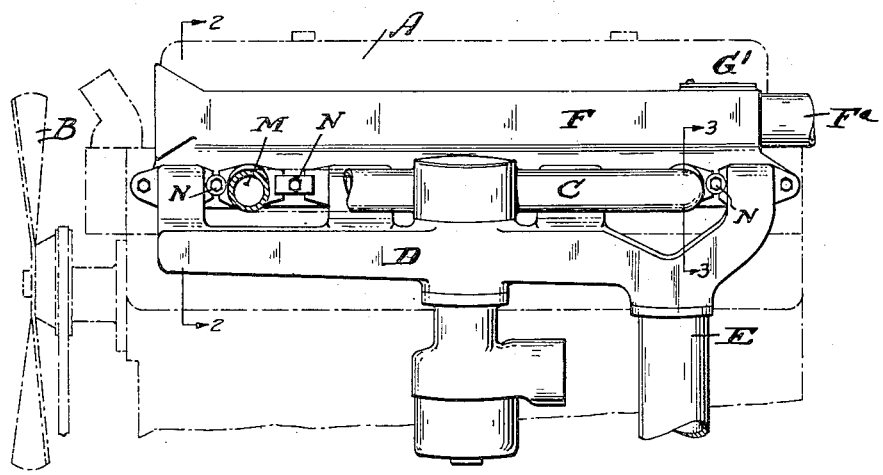
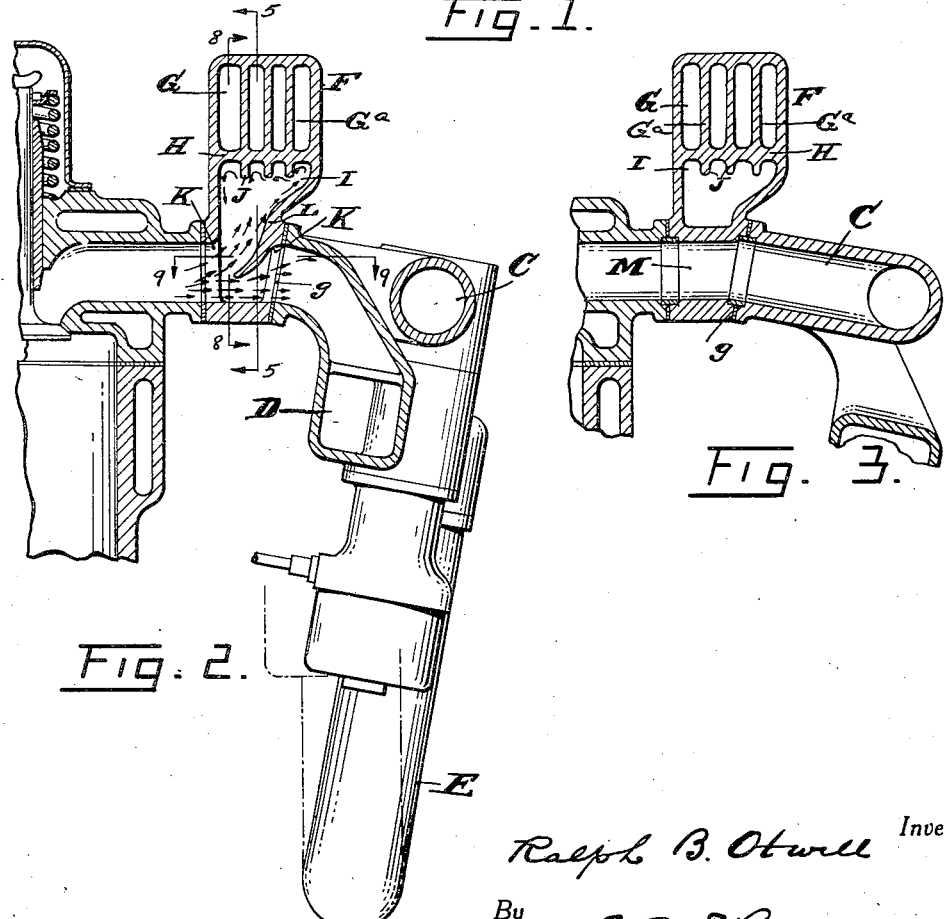
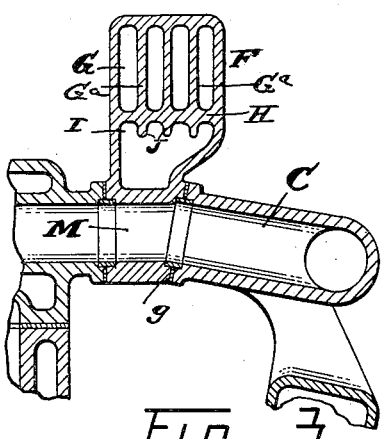
Inventor
Ralph B. Otwell
By S. E. Thomas
Attorney Oct. 9, 1934.   R. B. OTWELL   1,976,086
HEATER FOR MOTOR VEHICLES
Filed Feb. 10, 1931   3 Sheets-Sheet 2
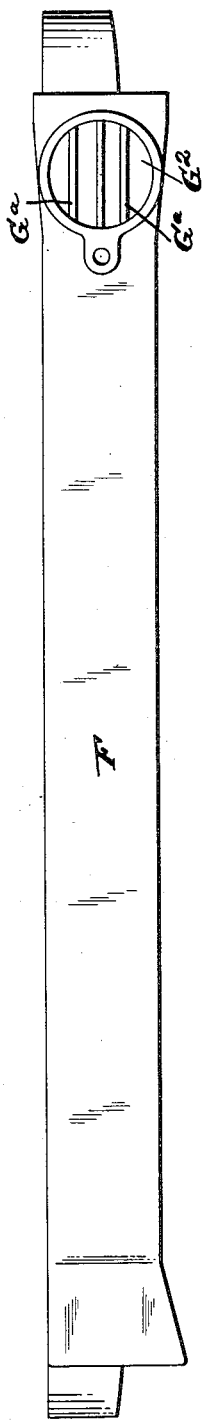
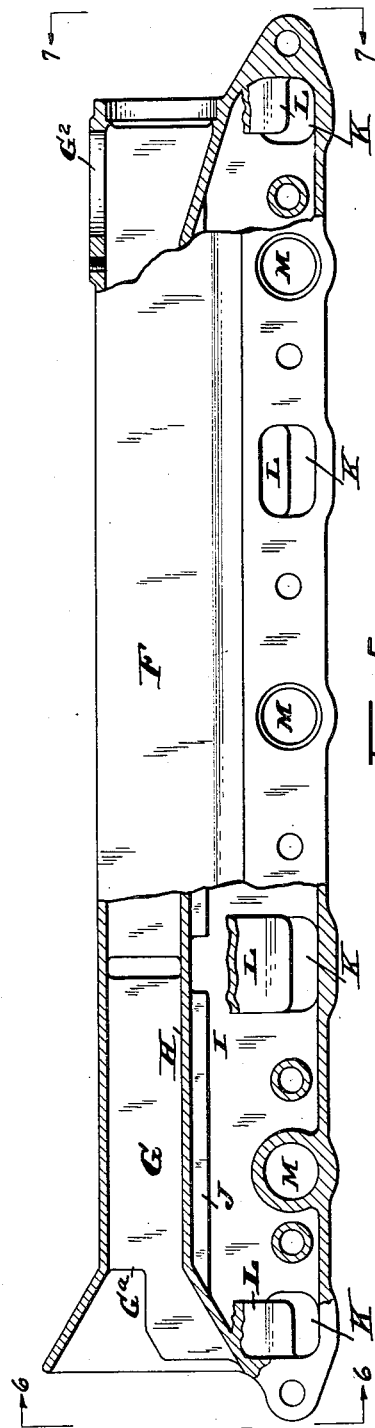
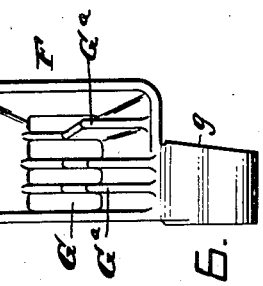
Inventor
Ralph B. Otwell
By S. E. Thomas
Attorney Oct. 9, 1934.   R. B. OTWELL   1,976,086
HEATER FOR MOTOR VEHICLES
Filed Feb. 10, 1931   3 Sheets-Sheet 3

Inventor
Ralph B. Otwell
By S. E. Thomas
Attorney

Patented Oct. 9, 1934

1,976,086

UNITED STATES PATENT OFFICE 1,976,086

HEATER FOR MOTOR VEHICLES

Ralph B. Otwell, Detroit, Mich.

Application February 10, 1931, Serial No. 514,883

7 Claims. (Cl. 257—241)

My invention relates to a heater for motor driven vehicles in which pure fresh air is heated by the exhaust gases discharged from an internal combustion engine, for delivery into the body of a vehicle.

One object of the present invention is to provide a simple inexpensive heater embodying an air chamber and an integral gas heater chamber, which may be readily and quickly installed without changing or altering the connecting parts of the power unit.

The heater is adapted to be lodged between the engine block and the inlet and exhaust manifolds and is secured in position by the bolts or other fastening devices employed to initially secure the intake and exhaust manifolds to the engine.

To install the heater, the intake and exhaust manifolds are first detached from the engine block,—they are then rocked away from the latter without disconnecting the pipes leading to the manifolds. The heater which is wedge-shaped in cross-section through its gas heated chamber is then inserted between the engine block and the inlet and exhaust manifolds—the wedge-shape formation adapting itself to the tilted position of the manifolds in relation to the engine block. Suitable gaskets are then inserted between the connecting parts, and the bolts—if sufficiently long—are then replaced to connect the manifolds to the engine,—thus securing the heater in position as an integral part of the power unit.

A further object of the invention,—particularly stressed,—is the means for diverting a portion of the exhaust gases passing from the engine into the gas chamber of the heater, to warm the air forced through the air chamber, as the balance of the exhaust gases from the engine flow without retardation or interruption directly into the exhaust manifold.

The gases diverted to heat the air in its passage through the chamber and thereby the body of the vehicle, are subsequently drawn from the gas heated chamber by the constant unchecked movement of the exhaust gases flowing from the engine at normal speed but travelling at far greater velocity than the diverted gases, directly into the exhaust manifold.

The exhaust gas in its passage creates a partial vacuum beneath the means employed for diverting a portion of the gas upwardly within the air heating chamber, which assist the eduction of the diverted gases along with the gases passing directly into the exhaust manifold.

With the foregoing and other objects in view which will appear as the description proceeds, the invention further resides in the combination and arrangement of parts and in the details of construction hereinafter described and claimed, it being understood that changes may be made in the precise embodiment of the invention herein shown without departing from the spirit of the same.

In the drawings accompanying this specification:

Figure 1 is a side elevation of the heater installed between the engine block—indicated in broken lines, and the intake and exhaust manifolds of the power unit—indicating in full lines,—with parts of the manifold broken away and in section.

Figure 2 is a cross-sectional view of the heater installed between the engine block and the inlet and exhaust manifolds,—taken on or about line 2—2 of Figure 1,—indicating in a fragmentary manner in dotted lines, the position of the exhaust and intake manifolds when connected directly with the engine block, prior to disconnecting these parts to rock them away from the engine,—as shown in full lines,—to receive the heater.

Figure 3 is a cross-sectional view through the heater and one of its gas inlet ports connecting the inlet manifold with the engine,—taken on or about line 3—3 of Figure 1,—a fragment of the inlet port and manifold being shown.

Figure 4 is a plan view of the heater showing an opening at one end for the discharge of the hot air under the hood of the power plant—not shown—during warm weather,—the cap serving as the closure for said opening having been removed.

Figure 5 is a vertical longitudinal sectional view, with a portion of the heater in side elevation.

Figure 6 is an end elevation, as viewed from line 6—6 of Figure 5.

Figure 7 is an end elevation of the device, as viewed from line 7—7 of Figure 5.

Figures 8, 9:
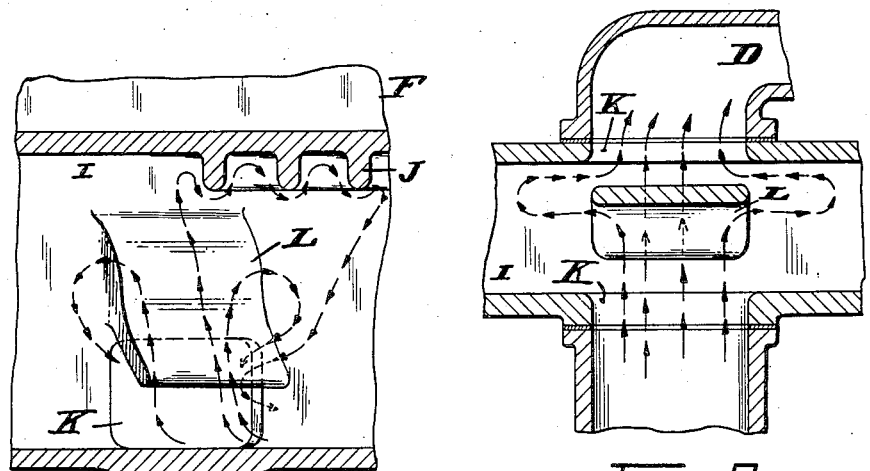

Figure 8 is a fragmentary sectional-perspective view through a portion of the heating chamber, showing an inwardly extending lip spaced from but overlapping the outlet for the exhaust gases through said chamber, with dotted arrow flights indicating the upward deflection of a portion of the gases passing through the chamber upon encountering the projecting lip that they may traverse a plurality of depending ribs integral with the horizontal wall dividing the air chamber from the gas chamber,—also other flights of arrows, indicating the eduction of the diverted gases from the chamber.

Figure 9 is a fragmentary horizontal sectional view through the exhaust gas chamber of the heater, installed between the engine block and the exhaust manifold, showing the ports through which the gas passes from the engine to the exhaust manifold, also a portion of a tongue projecting into the path of the exhaust gases, and flights of arrows indicating the exhaust gas diverted by the tongue toward the depending ribs (not shown) to heat the air chamber,—also other arrows, indicating the unimpeded flow of the exhaust gas under the tongue and its action in withdrawing the exhaust gas from the chamber, previously diverted to heat the air passing through the air chamber.

Figure 10:
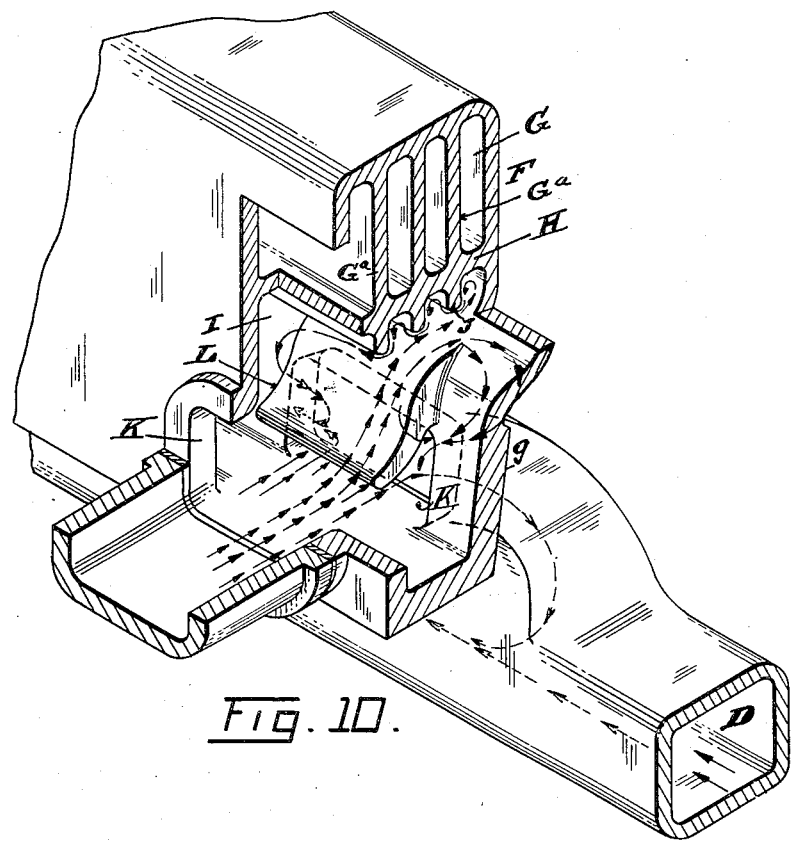

Figure 10 is a perspective view with parts cut away and in section, showing a fragmentary portion of the heater installed between one of the exhaust ports of an engine and its exhaust manifold, with flights of arrows indicating the passage of the exhaust gases from the engine through the ports in the heating chamber beneath the air chamber of the heater to the exhaust manifold, also a tongue projecting into the path of the exhaust gases, directing a portion of the exhaust gases upwardly against the wall separating the air chamber from the heating chamber, indicating also by a flight of arrows the deflected gas passing over the ribs depending from said wall to heat the air chamber, and by other flights of arrows, the withdrawal of the diverted gases over the side edges of the tongue into a port opening into the exhaust manifold.

Referring now to the letters of reference placed upon the drawings:

A denotes the engine, indicated in dotted lines, of a motor vehicle, B the usual fan, C the intake manifold and D the exhaust manifold connected with the exhaust pipe E.

F denotes the heater constructed of cast iron having an upper air heating chamber G, separated by a horizontal longitudinally extending partition wall H, from the exhaust gas chamber I.

$G^a$ are partitions dividing the heating chamber into narrow passage-ways thereby increasing the radiating surface over which the air passes on its way to the vehicle.

Depending from the horizontal partition wall H are a plurality of ribs J integral with the wall, serving to increase the heating surface over which the exhaust gases flow.

KK indicate ports in the opposing walls of the heating chamber through which the exhaust gases pass from the engine into the manifold D.

L denotes a lip integral with the wall of the heating chamber extending downwardly into the path of the exhaust gases to divert a portion of said gas upwardly against the floor and over the depending ribs J, projecting into the heating chamber,—the lip being spaced from the bottom of the heating chamber that a portion of the exhaust gases may flow in an uninterrupted manner at normal speed, from the engine into the exhaust manifold.

M denotes the fuel inlet ports leading from the inlet manifold C to the engine.

N denotes the usual bolts and clamping devices employed to secure the manifolds to the engine block.

$F^a$ indicates a pipe connection, between the heater and the body of the vehicle,—not shown,—and $G^1$ denotes a swinging closure cap covering a discharge outlet $G^2$, located adjacent the end of the heater to release the air during the summer months under the usual hood covering the power plant,—means not shown being provided to shut off the delivery of warm air into the body of the vehicle during that period.

To install the device in position upon the power plant, the clamping devices N, employed to secure the manifolds to the engine block are first released, the pipe and manifold are then rocked from the position shown in broken lines to that occupied in full lines, as indicated in Figure 2.

The heating chamber is constructed with an inclined wall $g$ on its outer face that it may accommodate itself to the face of the inlet and exhaust ports of the respective manifolds, when tilted to receive the heater. Without alteration or further adjustment of the connecting parts, the heater is then clamped between the manifolds and the engine block, by replacing the bolts previously employed,—or like bolts of greater length may be used if necessary.

As previously indicated, the exhaust gases on leaving the engine are intercepted by the depending tongue L, and which, while permitting a portion of the exhaust gases to pass from the engine beneath the tongue at normal unimpeded speed directly into the exhaust manifold, deflects the gases that contact with the lip upwardly against the underside of the floor of the air heating chamber and over its depending ribs.

The ribs J serve to increase the heating area and accelerate heating the air as it is driven by the fan through the air chamber into the body of the vehicle.

The normal speed of the exhaust gases deflected upwardly is somewhat checked by contact with the depending lip L in comparison with the speed of the exhaust gases passing unimpeded below the lip to the exhaust manifold. A partial vacuum is thus created beneath the lip which serves to assist in the withdrawal of the exhaust gases diverted upwardly along with the rapidly flowing exhaust gas passing unimpededly into the exhaust manifold.

It will be evident therefore that the exhaust gases deflected into the upper portion of the heating chamber are withdrawn continuously along with the flow of the exhaust gas into the manifold.

Having thus described my invention, what I claim is:

1. An automobile heater adapted for attachment between an internal combustion engine and its inlet and exhaust manifolds, comprising an integral cast structure having an air heating chamber; an exhaust gas heated chamber located beneath the air heating chamber, having a plurality of transverse ports for the passage of fuel gas from the intake manifold to the engine, also ports for the discharge of the exhaust gases from the engine by way of the gas-heated chamber into the exhaust manifold; and a deflector extending into the path of the exhaust gases to intercept and deflect a portion of the exhaust gases flowing through the gas heated chamber against the floor of the air heating chamber,—whereby the air passing through said chamber may be heated, while the remainder of the exhaust gases flowing unchecked at relatively higher speed below the said deflecting means directly into the exhaust manifold induce a partial vacuum beneath the deflecting means to assist the withdrawal of the deflected gases concurrently with the flow of the exhaust gases passing from the engine without interruption directly into the exhaust manifold.

2. An automobile heater adapted for attachment between an internal combustion engine and its inlet and exhaust manifolds, comprising an integral cast structure having an air heating chamber; an exhaust gas heated chamber, located beneath the air heating chamber, and having a plurality of transverse passages connecting the intake manifold with the engine, and also ports in the opposite walls of the chamber for the passage of the exhaust gases from the engine to the exhaust manifold; said structure being a depending inclined tongue integral with the casting extending downwardly into the path of the exhaust gases between the ports in the opposing walls of the chamber, whereby it may intercept a portion of the gases and deflect them upwardly against the floor of the air heating chamber, while the remainder of the gases flow unchecked at relatively higher speed below said deflecting tongue, creating a vacuum thereunder to assist the withdrawal of the deflected gases along with the exhaust gases passing directly from the engine without interruption into the exhaust manifold.

3. An automobile heater adapted for attachment between an internal combustion engine and its inlet and exhaust manifolds, upon rocking the latter in spaced relation to the engine block to receive it;—comprising an integral cast structure having an air heating chamber; an exhaust gas heated chamber below the air heated chamber, having tapering walls to adapt it to register between the tilted inlet and exhaust manifolds and the engine block, said gas heated chamber having a plurality of transverse ports for the passage of fuel gas from the intake manifold to the engine, also ports for the passage of the exhaust gases from the engine by way of the gas heated chamber into the exhaust manifold; and a depending tongue extending into the path of the exhaust gases to intercept and deflect a portion of the exhaust gases flowing through the gas heated chamber against the floor of the air heating chamber to heat the air passing through the latter.

4. An automobile heater adapted for attachment between an internal combustion engine and its inlet and exhaust manifolds; comprising an integral cast structure having an air heating chamber; an exhaust gas heated chamber located beneath the air heating chamber and having a plurality of transverse ports respectively and alternately connecting the intake and exhaust manifolds with the intake and exhaust ports of the engine block; means for deflecting a portion of the exhaust gases flowing through the gas heated chamber against the floor of the air heating chamber to heat the air in its passage through the chamber, the balance of the exhaust gases flowing freely beneath the deflecting means directly into the exhaust manifold; and means for releasing the heated air through an outlet in the air heating chamber, whereby it may be discharged outside the body of the automobile when desired.

5. An automobile heater adapted for attachment between an internal combustion engine and its inlet and exhaust manifolds, comprising an integral cast structure having an air heating chamber divided by a plurality of longitudinally extending partition walls spaced apart to form narrow corridors for the passage of air; an exhaust gas heated chamber located beneath the air chamber; having ribs depending from the floor of the air chamber into the gas heated chamber, and a plurality of ports for the passage of fuel gas from the intake manifold to the engine, also ports for the discharge of the exhaust gases from the engine by way of the gas heated chamber into the exhaust manifold; and means for deflecting a portion of the exhaust gases passing from the engine toward the floor of the air chamber and over the ribs depending therefrom in its passage to the exhaust manifold.

6. A heat exchanger for insertion between an engine block exhaust port having a seat, and exhaust duct having a seat, said exchanger including a shell providing a way having a draft receiving intake and remote therefrom a warmed air delivery duct, said exchanger having a chamber within the shell in communication with the exhaust to warm said air, and having relatively inclined oppositely directed seats, one for engaging the block seat and the other for engaging the duct seat, and assembly means mounting the duct and exchanger on the block.

7. An insert heater having a seat on one side about the ports of the engine block and on the opposite side a seat for the exhaust manifold normally positioned against the block for spacing the exhaust manifold from its engine block, said heater having a chamber connecting the ports, a shell housing a portion of said heater to receive heat from said chamber and provide a conduit having an intake opening, a draft promoting attachment for the intake opening, and assembly means for the manifold against the manifold seat of the heater and the heater block seat against the engine block.

RALPH B. OTWELL.